Patented Mar. 16, 1943

2,314,023

UNITED STATES PATENT OFFICE 2,314,023

SUBSTANTIVE AZO DYESTUFFS AND PROCESS OF MAKING SAME

Fritz Straub, Kaiseraugst, and Walter Hanhart, Riehen, Switzerland, assignors to Society of Chemical Industry in Basle, Basel, Switzerland No Drawing. Application July 25, 1940, Serial No. 347,554. In Switzerland August 8, 1939

11 Claims. (Cl. 260—143)

It has been found that valuable substantive dyestuffs of the stilbene series may be obtained by condensing the reduction products which are obtained by the cautious reduction of dinitrostilbene disulphonic acids of the formula

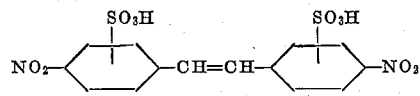

with aminoazo compounds which contain at least two aryl radicals united by an azo group and which also contain a salicylic acid grouping.

The reduction of the dinitrostilbene disulphonic acids of the above formula may take place in generally known manner, for example, by the use of grape sugar as reducing agent. Thus it is very probable that, by the union of two nitro groups, a reduction product is formed which contains an azo or an azoxy group, so that, for example, in the reduction of the dinitrostilbene disulphonic acid of the formula

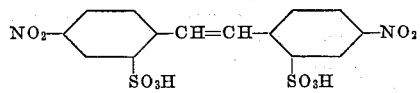

an azo or azoxy compound corresponding to the following formula

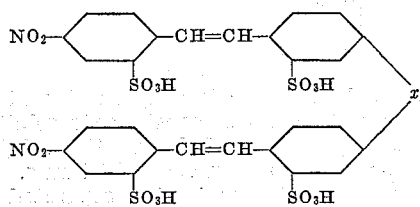

in which $x$ stands for —N=N— or

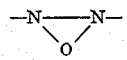

will be obtained as reduction product.

In the preparation of the aminoazo compounds which are to be condensed with the above reduction products according to the present process, the most varied diazo and coupling components may be united with one another in the usual manner. These components must, however, be so chosen that, in the aminoazo compound formed, at least two aryl radicals united by an azo group, together with a salicylic acid grouping, are contained in the resulting compound. Thus, these requirements are satisfied for example, if those aminoazo compounds are used in which the radical of salicylic acid is united with an aryl nucleus, for example, with a benzene nucleus, by means of an azo group, for example, in the para position to the hydroxyl group, so that these aminoazo compounds will be characterized by the presence of the group

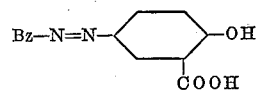

in which Bz represents the radical of a benzene nucleus.

In the simplest case, the amino group may stand in the benzene nucleus represented by Bz, for example, in the para position to the azo group, such as occurs, for example, in the para-amino-azosalicylic acid of the formula

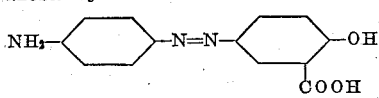

The characteristic group mentioned above, however, may also belong to an aminoazo compound which, besides aromatic ring systems, may also contain heterocyclic rings, having, for example, nitrogen as the hetero-atom, in its construction. This would be the case when, for example, compounds derived from pyrazolone, such as 1-(3-amino-4-hydroxy-5-carboxyphenyl) - 3 - methyl-5-pyrazolone or 1-(3-amino-5-carboxy-6-hydroxyphenyl) -3-methyl-5-pyrazolone were used for the preparation of the aminoazo compound, that is to say, for example, by alkaline coupling with diazotized para-aminosalicylic acid.

The condensation can be carried out, for example, by heating the components in alkaline—preferably caustically alkaline—media, with or without the application of pressure. 1 mol of the aminoazo compound may be used, for example, for every mol of the dinitro compound taken.

The dyestuffs obtained serve for the dyeing and printing of the most varied materials, such as animal and, particularly, vegetable fibers, for example, cotton, linen, rayon, and staple fiber obtained from regenerated cellulose. The dyeings may be treated in known manner with agents yielding metal, particularly with agents yielding copper, whereby they obtain greatly improved fastness properties. In this way, the dyestuffs mentioned yield very valuable, particularly reddish-orange dyeings. The dyestuffs obtained may also be advantageously used for dyeing according to the process of the French Patents No. 809,893 and No. 815,134.

The dyestuffs obtained may also be treated in substance with agents yielding metals (for example, copper).

Example 1

9 parts of the dyestuff obtained by reducing 45 parts of the sodium salt of 4:4'-dinitrostilbene-2:2'-disulphonic acid with 60 parts of caustic soda solution of 30 percent strength and 7 parts of grape sugar dissolved in about 400 parts of water at 70–80° C. and subsequently separating the reduction product of the probable formula

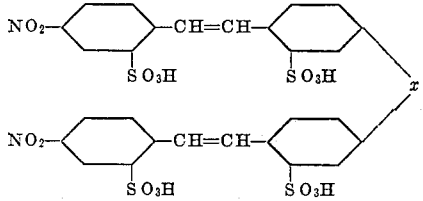

in which $x$ stands for —N=N— or

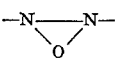

by neutralization and addition of sodium chloride, according to known methods, and 2.8 parts of the sodium salt of 4-amino-4'-hydroxy-1:1'-azobenzene-3'-carboxylic acid are dissolved in 100 parts of hot water and, after addition of 16 parts of sodium hydroxide solution of 30 percent strength, are boiled for about 12 hours under reflux. The reaction mixture is then allowed to cool, and the dyestuff which separates is removed by filtration; if necessary, it is redissolved in dilute caustic soda solution.

The dry dyestuff, is a dark brown powder, dissolving in concentrated sulphuric acid to a pure blue, in water to an orange yellow solution, and dyeing cotton from a dyebath containing Glauber's salt in orange shades, which, on treatment with copper salts, are converted into fast red-orange shades which are particularly fast to washing.

Example 2

6 parts of the dyestuff obtained as described in Example 1 by reduction of the sodium salt of 4:4'-dinitrostilbene-2:2'-disulphonic acid are mixed with the dyestuff of the formula

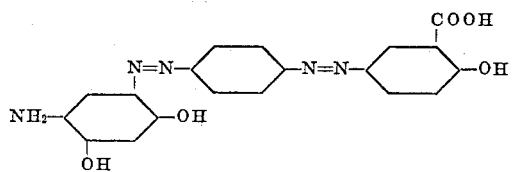

obtained by coupling 2.5 parts of 4-amino-4'-hydroxy-3'-carboxyazobenzene with 1.3 parts of 1-amino-2:4-dihydroxybenzene in soda-alkaline solution and subsequent isolation, and are boiled for 20 hours in a mixture of 100 parts of water and 16 parts of caustic soda solution of 30 percent strength under reflux. After cooling, the reaction product is filtered off and is reprecipitated from dilute caustic soda solution for purification purposes.

In the dry state, it is a dark green bronzy powder which dissolves in concentrated sulphuric acid with a blue, in water with a brownish-orange color and dyes cotton from a bath containing Glauber's salts in brownish-orange shades which, on aftertreatment with copper salts, become still redder and very fast to washing.

Example 3

6 parts of the dyestuff obtained as described in Example 1 by reduction of the sodium salt of 4:4'-dinitrostilbene-2:2'-disulphonic acid are mixed with 5.6 parts of the sodium salt of the dyestuff of the formula

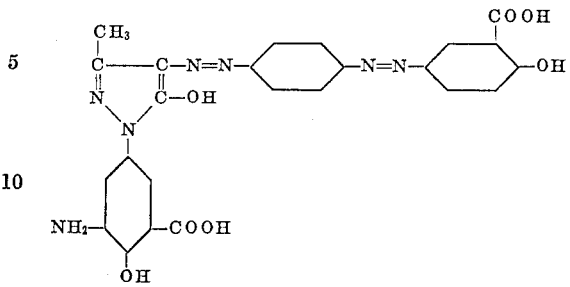

and are dissolved in a mixture of 100 parts of hot water and 16 parts of caustic soda solution of 30 percent strength, and the reaction solution is boiled for about 20 hours under reflux. After cooling, the dyestuff which separates is filtered off and is reprecipitated from dilute caustic soda solution.

The dry dyestuff is a dark colored powder which dissolves in concentrated sulphuric acid to a blue, in water to an orange solution. It dyes cotton from a dyebath containing Glauber's salts in orange shades which become redder on treatment with copper salts and thus acquire a very good fastness to washing.

The dyestuff of the above formula used in this example is obtained by coupling diazotised 4-amino-4'-hydroxy-3'-carboxyazobenzene with 1-(3-amino-5-carboxy-4-hydroxyphenyl)-3-methyl-5-pyrazolone in a solution made alkaline with soda.

Example 4

A mixture of 6 parts of the dyestuff described in Example 1 obtained by the reduction of the sodium salt of 4:4'-dinitrostilbene-2:2'-disulphonic acid and 5.6 parts of the sodium salt of the dyestuff of the formula

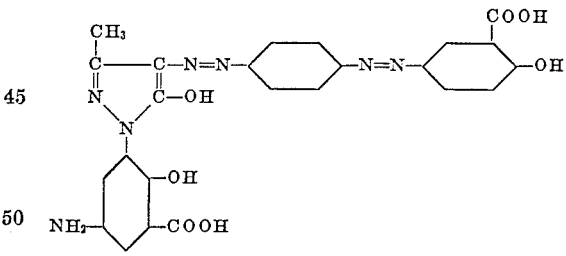

is dissolved in 100 parts of hot water with the addition of 16 parts of caustic soda solution of 30 percent strength and the reaction solution is boiled under reflux for about 20 hours. After cooling, the dyestuff which has separated is filtered off and is re-precipitated from dilute caustic soda solution.

The dry dyestuff is a dark colored powder which dissolves in concentrated sulphuric acid to form a blue, in water to form an orange solution. It dyes cotton from a dyebath containing Glauber's salts in orange shades which, on treatment with copper salts, become still redder in shade and of very good fastness to washing.

The azo dyestuff of the above formula used in this example is obtained by coupling diazotized 4-amino-4'-hydroxy-3'-carboxyazobenzene with 1-(3-amino-6-hydroxy-5-carboxyphenyl)-3-methyl-5-pyrazolone in a solution made alkaline with soda.

Example 5

A dyebath is prepared containing 2500 parts of water, 1 part of the dyestuff obtained according to Example 1 and 3 parts of anhydrous sodium carbonate. 100 parts of cotton are entered at 40° C., the temperature is raised during ¼ hour to the boil, 30 parts of crystalline sodium sulphate are added, and dyeing is continued for a further 1 hour at 90° C.

70 parts of a solution, obtained from 10 parts of crystalline copper sulphate, 12 parts of tartaric acid, 1000 parts of water and sufficient caustic soda solution to give a neutral reaction, are now added to the above dyebath. Dyeing is continued for a further ¾ hour at 90° C., after which the cotton is rinsed and dried in the usual manner. The cotton is dyed in fast red-orange shades.

What we claim is:

1. Process for the manufacture of substantive azo dyestuffs which comprises condensing in a caustic alkaline medium the reduction product, obtained by subjecting a dinitrostilbenedisulphonic acid of the formula

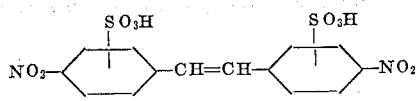

to the action of a feebly acting reducing agent, with an aminoazo compound which contains at least two aryl nuclei united by an azo group and which also contains a salicylic acid grouping, the aryl nuclei being members of the group consisting of the benzene, naphthalene and pyrazolone series.

2. Process for the manufacture of substantive azo dyestuffs which comprises condensing in a caustic alkaline medium the reduction product, obtained by subjecting a dinitrostilbenedisulphonic acid of the formula

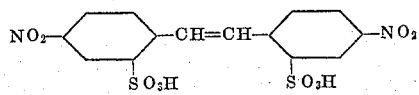

to the action of a feebly acting reducing agent, with an aminoazo compound which contains at least two aryl nuclei united by an azo group and which also contains a salicylic acid grouping, the aryl nuclei being members of the group consisting of the benzene, naphthalene and pyrazolone series.

3. Process for the manufacture of substantive azo dyestuffs which comprises condensing 1 mol of the reduction product, obtained by subjecting a dinitrostilbenedisulphonic acid of the formula

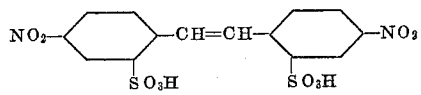

to the action of a feebly acting reducing agent, in caustically alkaline medium with 1 mol of an aminoazo compound which contains at least two aryl nuclei united by an azo group and which also contains a salicyclic acid grouping, the aryl nuclei being members of the group consisting of the benzene, naphthalene and pyrazolone series.

4. Process for the manufacture of a substantive azo dyestuff which comprises condensing in a caustic alkaline medium the reduction product, obtained by subjecting a dinitrostilbenedisulphonic acid of the formula

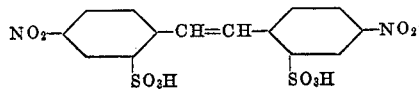

to the action of a feebly acting reducing agent, with the aminoazo compound of the formula

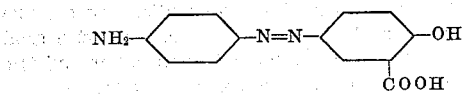

5. Process for the manufacture of a sustantive azo dyestuff which comprises condensing in a caustic alkaline medium the reduction product, obtained by subjecting a dinitrostilbenedisulphonic acid of the formula

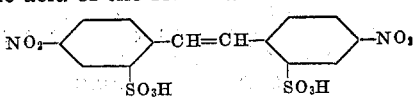

to the action of a feebly acting reducing agent, with the aminoazo compound of the formula

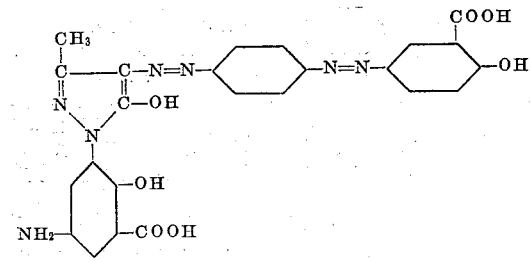

6. Process for the manufacture of a substantive azo dyestuff which comprises condensing in a caustic alkaline medium the reduction product, obtained by subjecting a dinitrostilbenedisulphonic acid of the formula

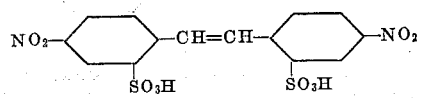

to the action of a feebly acting reducing agent, with the aminoazo compound of the formula

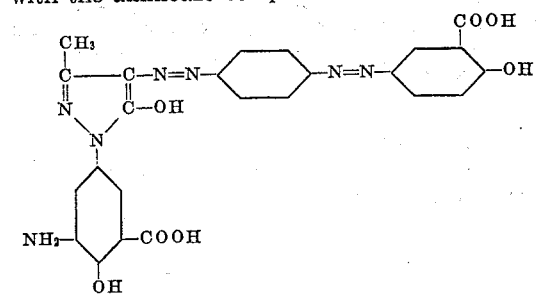

7. The substantive azo dyestuffs dyeing cotton orange shades which are obtained by condensing the reduction product, obtained by subjecting a dinitrostilbenedisulphonic acid of the formula

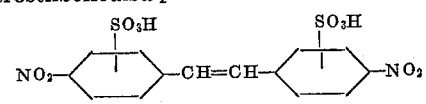

to the action of a feebly acting reducing agent, with an aminoazo compound which contains at least two aryl nuclei united by an azo group and which also contains a salicylic acid grouping, the aryl nuclei being members of the group consisting of the benzene, naphthalene and pyrazolone series.

8. The substantive azo dyestuffs dyeing cotton orange shades which are obtained by condensing 1 mol of the reduction product, obtained by subjecting a dinitrostilbenedisulphonic acid of the formula

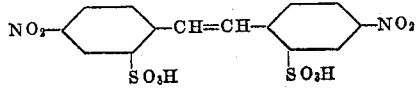

to the action of a feebly acting reducing agent, with 1 mol of an aminoazo compound which contains at least two aryl nuclei united by an azo group and which also contains a salicyclic acid grouping, the aryl nuclei being members of the group consisting of the benzene, naphthalene and pyrazolone series.

9. The substantive azo dyestuff which is obtained by condensing the reduction product, obtained by subjecting a dinitrostilbenedisulphonic acid of the formula

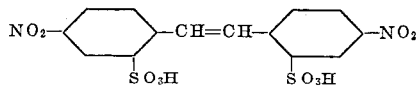

to the action of a feebly acting reducing agent, with the aminoazo compound of the formula

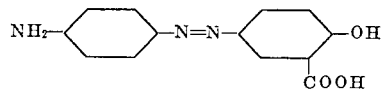

said dyestuff dissolving in concentrated sulphuric acid to a pure blue, in water to an orange yellow solution and dyeing cotton in orange shades which, on treatment with copper salts, are converted into red orange shades which are particularly fast to washing.

10. The substantive azo dyestuff which is obtainable by condensing the reduction product, obtained by subjecting a dinitrostilbenedisulphonic acid of the formula

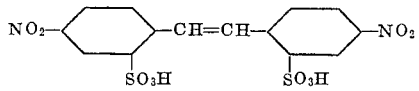

to the action of a feebly acting reducing agent, with the aminoazo compound of the formula

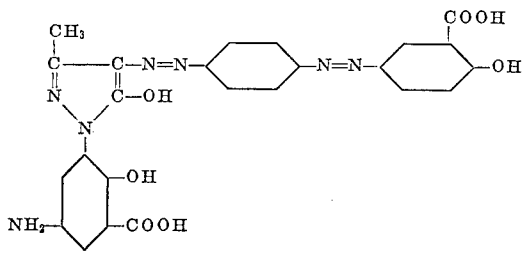

said dyestuff dissolving in concentrated sulphuric acid to a blue, in water to an orange yellow solution and dyeing cotton in orange shades which, on treatment with copper salts, are converted into red orange shades which are particularly fast to washing.

11. The substantive azo dyestuff which is obtained by condensing the reduction product, obtained by subjecting a dinitrostilbenedisulphonic acid of the formula

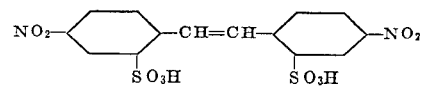

to the action of a feebly acting reducing agent, with the aminoazo compound of the formula

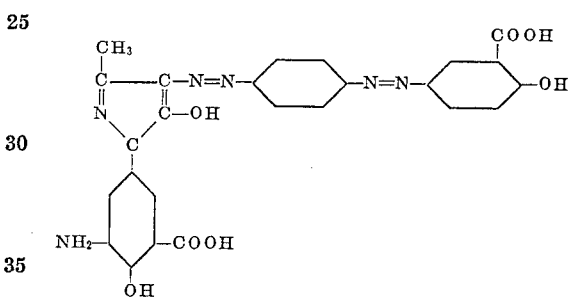

said dyestuff dissolving in concentrated sulphuric acid to a blue, in water to an orange yellow solution and dyeing cotton in orange shades which, on treatment with copper salts, are converted into red orange shades which are particularly fast to washing.

FRITZ STRAUB.
WALTER HANHART.